Patented Nov. 3, 1931

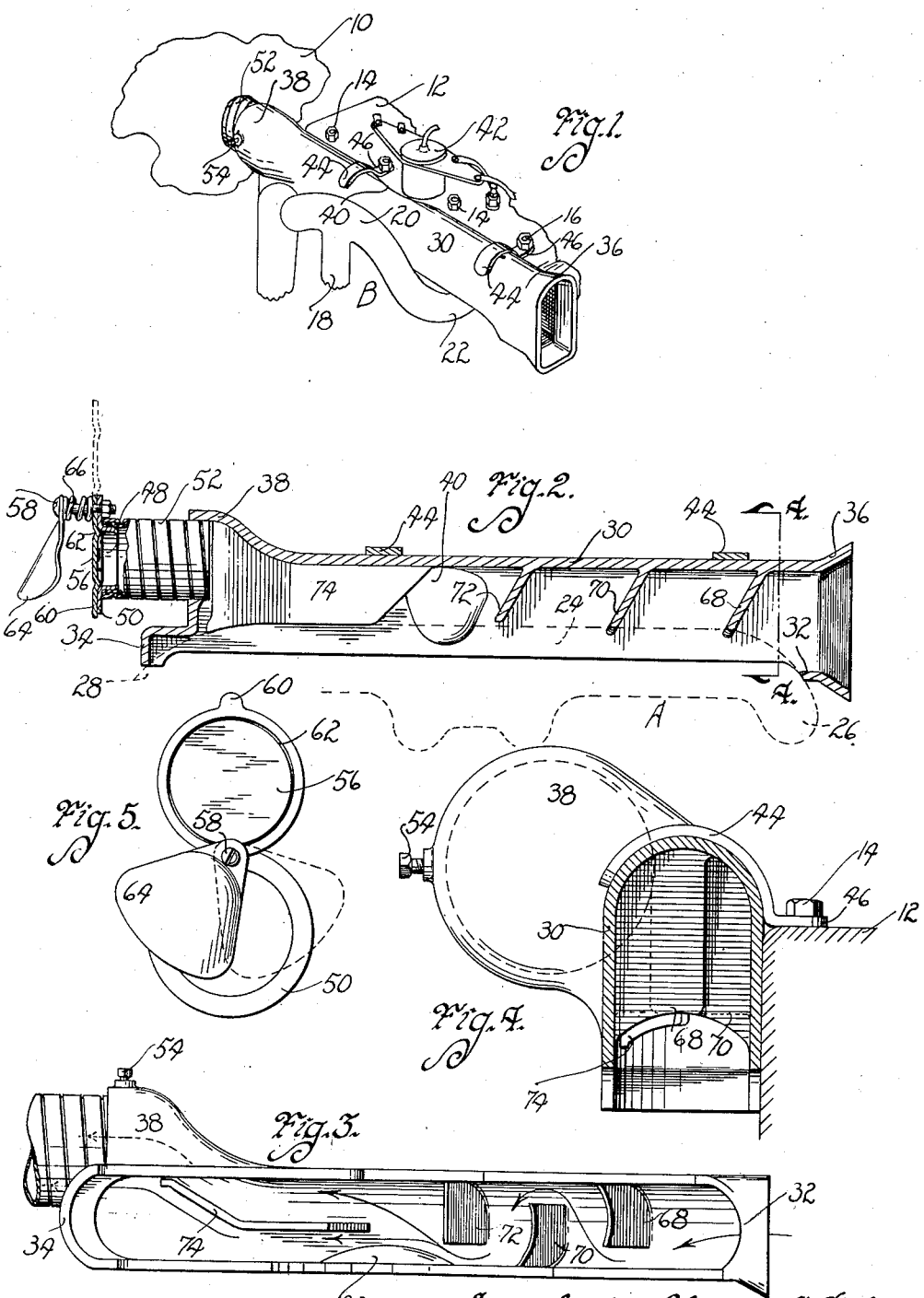

1,830,090

UNITED STATES PATENT OFFICE

HARRY J. COCKS, OF DES MOINES, IOWA, ASSIGNOR TO METAL PRODUCTS COMPANY, OF DES MOINES, IOWA, A CORPORATION OF IOWA

AUTOMOBILE HEATER

Application filed May 31, 1930. Serial No. 458,705.

The object of this invention is to provide an improved construction for heaters for automobiles capable of being constructed of metal by casting or molding and of quickly heating large quantities of air by contact with the exhaust manifold of the vehicle and delivering the heated air to the interior of the vehicle body.

A further object of the invention is to provide an improved automobile heater having a heater member of rigid construction adapted to be easily and quickly mounted in position for use and held in such position by means of clamping clips overlying the heater member whereby the device may be installed with a minimum of time and labor and without making any alterations of the power plant of the automobile.

Another object of the invention is to provide an improved heater of cast metal having enlarged interior surfaces for quickly heating the passing air currents.

Still another object of the invention is to provide an improved automobile heater of cast metal having staggered baffle plates for retarding the progress of air currents therethrough for more effectively heating the air.

Another and further object of the invention is to provide an improved automobile heater of cast metal which is durable in construction and which may be easily and quickly mounted in place relative to the motor and to the exhaust manifold and be firmly held in such position by simple yet effective means.

Another object of the invention is to provide an automobile heater having improved means for mounting controlling devices relative to the vent pipe which is adapted to discharge heated currents of air to the interior of the vehicle body.

A further object is to provide a heater having improved means affording communication between the air heating chamber and a vehicle body and for effecting such communication at the desired location with respect to the body.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view showing the improved automobile heater in position for practical use.

Figure 2 is a longitudinal section through the heater member, the exhaust manifold of the vehicle being indicated by dotted lines.

Figure 3 is a bottom plan view of the heater member detached.

Figure 4 is an enlarged cross section on the line 4—4 of Figure 2 illustrating some of the baffle devices and also the means for holding the heater member in place.

Figure 5 is an elevation illustrating the controlling devices for the vent pipe.

This heater is particularly designed for use on the model "A" Ford automobile, the dash of which is indicated by the numeral 10.

The motor of the automobile is provided with a removable head 12 adapted to be held in place on the motor block by means of a plurality of threaded members such as nuts 14 engaging threaded studs 16.

The power plant of the automobile includes an exhaust manifold A which is arranged in substantially horizontal position along one side of the motor block or the head 12 thereof. There is also an intake manifold B including a vertical pipe 18 leading from the carburetor and terminating in an arched delivery portion 20, the principle portion of which is located adjacent the outer face of the exhaust manifold A. The arched delivery member 20 has its end portions at an elevation lower than its central portion and these end portions, indicated by the numeral 22, are directed laterally, pass beneath the exhaust manifold A and communicate with the motor.

The exhaust manifold A is formed with a substantially horizontal body portion 24 having a downturned forward end 26 and a downturned rearward end 28.

I have provided an elongated heater member 30 which preferably is suitably formed from metal by casting or molding. The heater member is of such size and shape that it may be received snugly between the head 12 of the motor and the upwardly arched portion 20 of the intake manifold B and rest directly upon the exhaust manifold A. The bottom of the heater member 30 is open substantially throughout its length and the opening in its bottom is somewhat longer than the top of the horizontal body portion 24 of the exhaust manifold, which projects upwardly within the heater member as indicated in Figure 2. At its forward end the heater member 30 is formed with a shoulder 32 which engages the curved forward margin of the exhaust manifold A where the body portion 24 merges into the downturned portion 26, and at its rear end with a shoulder or flange 34 which rests on the curved surface where said body member merges into the downturned portion 28. In this manner the heater member is firmly supported on the exhaust manifold and is snugly held between the motor and the upwardly arched portion of the intake manifold. The margins of the opening in said heater member closely engage the exhaust manifold to form an enclosed heating chamber of which the manifold constitutes the bottom.

The heater member 30 is formed with an open bell shaped forward end 36 which is adapted to admit air to the heater member for contact with the exhaust manifold.

At its rear end the heater member 30 is formed with a delivery portion 38 which preferably is offset upwardly and laterally in order to bring the discharge means to the desired location relative to the dash 10 of the vehicle.

The inner side wall of the heater member 30 may be formed with an indentation 40 to provide space between the heater member and the motor for a portion of the distributor 42 of the ignition system.

The heater member 30 is rigidly held in place by means of clamping clips 44, preferably two in number. Each of the clamping clips is formed of a curved strap or bar of metal adapted to extend across the upper part of the heater member 30 and having at its inner end a horizontal apertured ear 46 to receive one of the studs 16 and to be held in place by a nut 14 mounted on said stud.

In the operation of installing the heater a circular opening is formed in the dash 10 and in this opening is mounted a collar 48 having a face flange 50 at its forward end adapted to engage the rearward face of the dash.

The collar 48 is designed to communicate with the open rear end of the delivery part 38 of the heater by means of a short length of piping 52 which preferably is composed of metallic hose. The forward end of the piping 52 is moved into engagement with the rear face of the dash 10, embracing the collar 48, and then is held firmly in such position by means of a set screw 54 threaded in the delivery portion 38 of the heater member. The piping 52 desirably is in the nature of the well-known metallic hose formed of a strip of metal spirally wound with overlapping edges, having some flexibility and some ability to expand and contract longitudinally, thus serving to compensate for minor relative movements of the heater body and the vehicle dash to which the respective ends of the piping are connected.

A closing plate 56 is pivoted on a bolt or the like 58 which may extend through the flange 50 of the outlet collar and through the dash member 10 when the device is installed. The closing plate is provided with a projecting lip 60 for convenience in manipulating it. The closing plate is adapted to be arranged in position for wholly or partially closing the mouth of the delivery pipe through the collar 48 or for leaving the passage entirely open as shown in Figure 5. It may be provided with an inwardly projecting annular rib 62 adapted to seat within the collar 48 at times to assist in holding the plate in closed position.

A heat deflector 64 may also be pivotally mounted on the bolt 58 and be arranged for deflecting air currents laterally from the mouth of the heater. As shown, the deflector 64 is substantially triangular in shape, is slightly concavo-convex in cross section and is spaced somewhat from the collar 48. The bolt 58 is of sufficient length to permit the mounting of a coil spring 66 between the deflector plate 64 and closing plate 56 and the pressure of said spring is employed for holding said plates and especially the deflector in any position in which it may be placed manually, as well as to prevent rattling.

I preferably provide a plurality of baffle plates within the forward part of the heater member 30 and in this instance they are three in number and designated by the numerals 68, 70 and 72, respectively. The baffle plates are formed integrally with the heater member and project downwardly from the upper wall thereof and preferably are inclined somewhat toward the rear at their lower ends as clearly shown in Figure 2.

The baffle plates also are attached to one side wall of the heater member 30 but at their opposite margins are spaced from the other side wall. The baffle plates also are staggered laterally from end to end of the heater member so that a laterally sinuous passageway is provided for air as it travels through the heater member as indicated in Figure 3. This retards the flow of air through the heater member and permits a longer contact with the upper surfaces of the hot exhaust manifold A. The baffle plates may also be of less depth progressively from the forward to the rearward end of the heater member 30 as indicated in Figure 2 because of the necessary slight upward travel of air currents to reach the delivery piping 52. As shown, the two forward baffle plates 68 and 70 are curved at their lower margins to conform to the curvature of the upper surface of the member 24 of the exhaust manifold.

Within the rear part of the heater member 30 I provide a divider plate 74 which in this instance is formed on and depends downwardly from the top wall of the member. The divider plate 74 preferably is of considerable length and extends substantially longitudinally of the heating chamber. It preferably is shaped at its lower margin and in close contact with the top of the exhaust member 24. The divider plate 74 divides the rear portion of the heating chamber into two passages as clearly indicated in Figure 3.

It is the function of the divider plate 74 as well as an added function of the baffle plates 68, 70 and 72 to provide enlarged interior surfaces for the heating chamber. The result of this is that greater quantities of air passing through the heating chamber are caused to engage heated metallic surfaces and this adds largely to the efficiency of the device. It will be noted that the baffle plates and divider plate are formed integrally on one or more walls of the heater member 30 and also that, in some instances at least, they contact with the exhaust manifold A, which is of course heated to a high temperature during operation of the motor. It, therefore, follows that the walls of the heater member 30, including the extra internal surfaces provided by the baffle plates and divider plate, afford an excellent means for heating the currents of air passing through the heater member.

It will be noted that because of the rigid character of the heater member 30, and the fact that it is mounted to fit snugly between the motor head 12 and the upwardly arched portion 20 of the intake manifold, and also because the heater member is caused to partially embrace the tapered upper part of the exhaust manifold A, that a stable location and mounting is thus provided for the heater member so that there is very little tendency for it to move from its normal position. It, therefore, follows that the clamping clips 44 which engage over and across the top of the heater member 30 and are held by the nuts 14, are amply sufficient to prevent any movement of the heater member from its proper location. I have thus provided a novel, convenient and effective means for mounting the heater relative to the power plant of the automobile and have made it easy to install the device.

The method of mounting the closing plate 56 and deflector plate 64 on the flange of the collar 48 is also a convenience because it provides a unitary structure and further facilitates the installation of the device.

As the heater member 30 is formed of cast metal it is rigid, sturdy and durable and not subject to collapse or distortion in use. It also provides an effective heating chamber because the heavy cast metal walls of ample surface retain heat from the heated exhaust manifold for heating the passing air currents, so that ample quantities of heated air are delivered to the vehicle body during normal traveling speed of the automobile.

I claim as my invention:

1. In a heater for a motor driven vehicle, a separately formed heater body closed at its top and sides and open at its ends, the lower side of said body being formed with an elongated opening having longitudinal margins fitting against the lateral sides of the exhaust manifold of the motor and curved at its ends to engage the ends of said manifold, transversely arranged and staggered baffle plates depending from the top of said body into engagement with the top of said manifold, and securing means for resisting upward movement of said body relative to said manifold.

2. In an automobile heater, a heater body composed of a cast metal shell of greater length than the exhaust manifold of the motor with which it is used, said shell having in its lower side an elongated opening, the margins of which engage throughout an intermediate longitudinal periphery of the exhaust manifold to permit the shell to rest thereon and enclose the upper portion thereof, thereby coacting with the manifold to form an air heating chamber, said shell being formed with integrally cast baffle plates spaced longitudinally and staggered laterally, each baffle plate extending inwardly from one side wall of the shell and downwardly from its top wall substantially to the top of the manifold to provide a sinuous passage through the shell, and clamping means for detachably holding said shell in place on said manifold.

HARRY J. COCKS.